United States Patent [19]

Kowalewski et al.

[11] Patent Number: 5,678,208
[45] Date of Patent: Oct. 14, 1997

[54] TRANSMISSION SYSTEM

[75] Inventors: Rolf Ernst Kowalewski, Palatine; Steven James Fillingim, Elk Grove Village; David Thomas Tennant, Flossmoor; Kirby Eric Kirchhoff, Park Ridge, all of Ill.

[73] Assignee: Motorola, Inc., Schaumburg, Ill.

[21] Appl. No.: 504,210

[22] Filed: Jul. 19, 1995

[51] Int. Cl.[6] ............................................. H04B 17/02
[52] U.S. Cl. ........................... 455/115; 455/67.1; 455/126
[58] Field of Search ................................. 455/115, 102, 455/103, 67.1, 8, 9, 92, 56.1, 116, 126, 67.4; 524/95; 379/59, 60

[56] References Cited

U.S. PATENT DOCUMENTS

| | | | |
|---|---|---|---|
| 5,095,500 | 3/1992 | Tayloe et al. | 379/32 |
| 5,113,525 | 5/1992 | Andoh | 455/127 |
| 5,345,598 | 9/1994 | Dent | 455/54.1 |
| 5,423,071 | 6/1995 | Hanninem | 455/67.3 |
| 5,471,649 | 11/1995 | Rees et al. | 455/67.4 |
| 5,548,799 | 8/1996 | Kobayashi et al. | 455/8 |
| 5,548,820 | 8/1996 | Victorin | 455/67.4 |
| 5,590,415 | 12/1996 | Beltola et al. | 455/115 |

FOREIGN PATENT DOCUMENTS 0070321  3/1991  Japan.

*Primary Examiner*—Reinhard J. Eisenzopf
*Assistant Examiner*—Lee Nguyen
*Attorney, Agent, or Firm*—Raymond J. Warren

[57] ABSTRACT

A remote power measuring device (1) is used to measure the power output of the transmission system (20). The measured power is then transmitted to a controller (5) and used by the controller (5), along with preset calibration data (41) for each power amplifier (3), to determine power output adjustment factors (22). The adjustment factors (22) are then communicated to the appropriate power amplifier (3) to adjust its output.

17 Claims, 2 Drawing Sheets

5,678,208

TRANSMISSION SYSTEM

FIELD OF THE INVENTION

The present invention relates, in general, to transmission systems, and more particularly, to a means for remotely tuning a transmission system.

BACKGROUND OF THE INVENTION

In a typical radio frequency transmission system using multiple radio channels, as used particularly in a cellular mobile telephone system, the power levels of the different radio carriers at a given cell site must be adjusted to a precise power level, consistent with the system design, in order to reduce interference when frequencies are re-used in other cells. FIG. 1 shows such an implementation of a typical transmission system 45. It is known in the art to combine the power output of multiple single tone RF amplifiers 3, by use of a combining means 15, onto a common antenna 16. It is also common to install a power metering means 14 in the RF (Radio Frequency) connection between combiner 15 and antenna 16.

Current cellular system requirements demand further that the power output of each RF carrier be adjustable in eight steps of 4 dB (deciBels) each to further minimize interference from frequency reuse. Step 0 affords maximum transmit power output; and minimum power is transmitted at step 7. These power steps are commonly determined during production and are referenced to the maximum power step (step 0) of the PA (Power Amplifier). Adjusting the power by changing the power steps is the means of optimizing the cell site transmit power.

As the combiner losses vary with inter-carrier frequency spacing, calibration of the system must be done on each carrier individually. It is common practice to adjust the RF output level of power step 0 by adjusting the gain of each of the plurality of power amplifiers 3 while observing the transmit power on power meter 14. In other cases, the drive level of each transceiver 13 can be adjusted for the correct power level as indicated on power meter 14. In either case this procedure must be repeated for each RF carrier at each cell site; and must be repeated if any system changes have to be made. It must also be repeated every time any combiner 15, PA 3, or transceiver (XCVR) 13 is replaced or serviced.

It would therefor be desirable, if this powder level adjustment could be made remotely from a central location, since the number of cell sites affected by minute system reconfigurations is becoming very large. Sending technicians to each affected cell site is thus very time consuming and expensive. Toward this end of remote transmitter optimization, the power output level must also be readable from this central location. The purpose of this invention is to propose the means and the methodology necessary to accomplish this task.

DETAILED DESCRIPTION OF THE DRAWINGS

Figure 1:
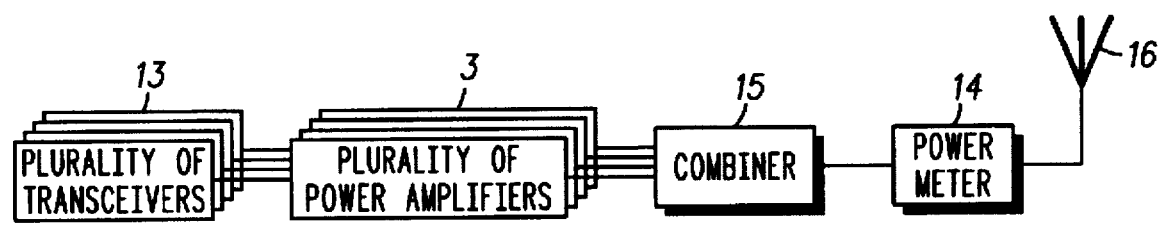
FIG. 1 is a block diagram of a prior art transmission system.
Figure 2:
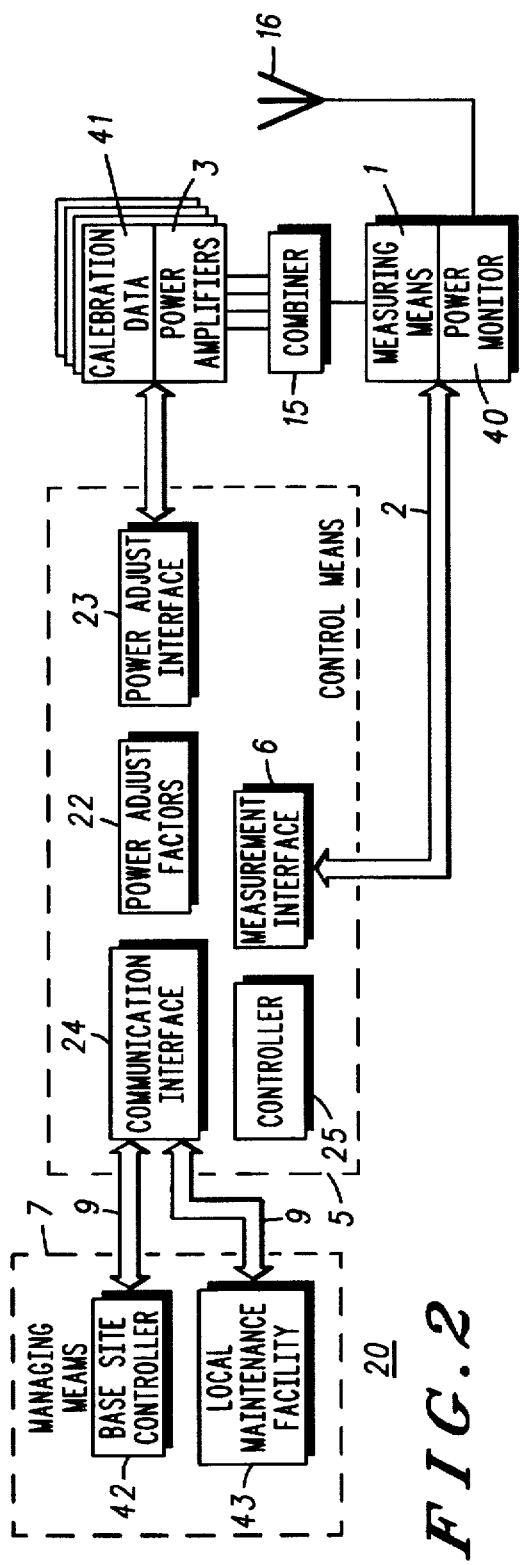
FIG. 2 is a block diagram of a transmission system embodying the present invention.

Referring initially to FIG. 2, a block diagram of a transmission system, generally designated 20, embodying the present invention is illustrated. Transmission system 20 comprises a managing means 7, a control means 5, and a remote power measuring means 1. Remote power measuring means 1 comprises a power monitor 40 which is coupled to measure the power sent from a combiner 15 to an antenna 16. A plurality of power amplifiers (PAs) 3 are coupled to combiner 15. Each PA 3 contains calibration data 41 which has data used to calibrate the PA 3. The basic transmission system has been expanded to allow complete remote power adjustment and automatic power control, providing remote display of output level for the benefit of the remotely located operator.

The transmission system block diagram shown in FIG. 2 is an embodiment of this invention. Each of the plurality of power amplifiers 3 (for example single tone power amplifiers) contains a calibration data 41. This calibration data 41 is created during the production process of the PA; and contains performance data of that PA. Each PA 3 can be accessed by a control input/output port of that PA. After the outputs of all of the PAs are united in combiner 15 through a plurality of inputs, the output level is measured in measuring means 1 as the signals are routed to antenna 16 to provide power output measurement data. Measuring means 1 containing a remote reading power meter 40.

Managing means 7 comprises two independent control points. The Base Site Controller (BSC) 42 automatically controls the system RF output level during normal operation by means of the eight power output steps in order to optimize carrier frequency re-use. It can further be used to manually issue power adjustment commands. These step adjustments are used for cellular system optimization as the result of system changes and are used in conjunction with PA output level data from the remote power monitor 40. The results are remotely displayed to the operator. A Local Maintenance Facility 43, typically located at a base site, provides all of the features of the Base Site Controller 42, except the automatic operation, and is typically used for initial set-up or service verification.

Control means 5 uses a microcontroller 25 to manage all functions needed to control the system power output of all PAs 3. The PAs are managed via power adjust interface 23 and the control input/output port of each PA by using the power output measurement data from power monitor 40 as an input to measurement interface 6 and the control commands from managing means 7 via the communication interface 24. Communication interface 24 also sends the measurement data to be displayed for the operator to either base site controller 42 or local maintenance facility 43. This displayed data can be used as verification of executed power level change commands from either the base site controller or the local maintenance facility.

Power adjustment factors 22 for the eight power steps, which are defined by cellular system specifications, are calculated for each of the PAs served by control means 5. The power adjustment factors for each PA are calculated from the calibration data of each PA, and the adjusted power level for the target output power for the highest power step (Step 0) of that PA. After the power adjustment factors are calculated, the PA can be adjusted to any desired power output step quickly and with minimum instruction. Additional tables might be calculated for use at different operating frequencies, different target output power levels, and/or temperatures.

Figure 3:
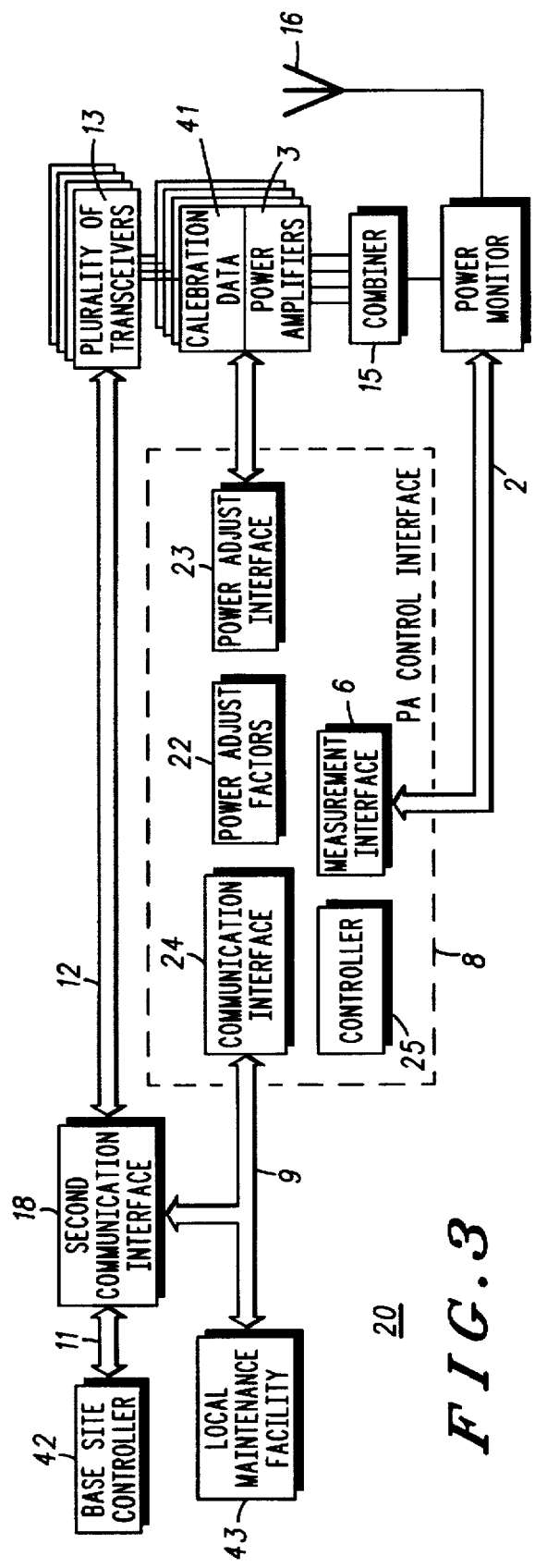
FIG. 3 is a block diagram of a second transmission system embodying the present invention.

The preferred embodiment of a transmission system 30, as shown in FIG. 3, contains a few refinements over the system discussed in FIG. 2. A plurality of transceivers 13 each constitute an RF drive source providing an RF input for each PA. While a second communications interface 18 indicates that a number of different communicating means are used to communicate between base site controller 42, local maintenance facility 43, transceivers 13, and power amplifier control interface 8. In particular, a first input/output of this second communication interface communicates with the base site controller 42 via bus 11, while a second input/output controls all transceiver functions of transceivers 13 via bus 12; a third input/output controls all PA functions via bus 9 and the power amplifier control interface and bus 4.

The remote power level adjustment of the transmitter of a cellular base site, as described in this invention, can be divided into two distinct functions.

The first function is that of system adjustment. When output power of a PA needs to be adjusted, commands from either managing means can be routed to the PA control input via the communication interface 24 and the power adjust interface 23 of the control means 5 or 8. The resulting power level of that PA is measured by the power monitor 40 or 14, and the resulting data is transmitted via measurement interface 6, communication interface 24, and bus 9 to the local maintenance facility 43 for display. Alternately, it can be routed via bus 9, the second communication interface 18, and bus 11 to the remotely located base site controller 42, to be remotely displayed there. When the displayed values confirm correct power output level at the power monitor 40, controller 25, of control means 5 or 8, is instructed to calculate the corresponding power adjust factors 22 for the eight power steps of that PA. Each power step can now be invoked, measured, and remotely displayed, to verify proper operation. This procedure must be repeated for every PA needing adjustment.

The second function is the system operation. Once adjusted, base site controller 42 automatically causes every PA 3 to transmit at the desired power step level, by choice of the correct power adjustment factor 22, required by the signal conditions due to the location of individual subscriber units. This determination is based on receive signal strength in transceiver 13 and knowledge of the subscriber units transmit power. Signal flow is from transceiver 13 via bus 12, the second communications interface 18, and bus 11 to the base site controller 42. Second communications interface 18 is also connected to each transceiver control port via bus 12 for various other functions.

The signal flow, for the control of the base transmit signal, is from base site controller 42 via bus 11, second communications interface 18, bus 9, to the communications interface 24 of the control means. Here controller 25 causes the correct power adjust factor 22 to be selected and sent to a control input/output of a specific PA 3 via power adjustment interface 23 and bus 4.

If a PA is to be operated at different, predetermined frequencies at different times of day and/or at different predetermined power output levels at different times of day, additional power adjustment factors can be stored in different tables and can thus be used to operate the particular PA at the precise power levels required for those predetermined frequencies. This feature allows for dynamic system reconfiguration, as might be desirable during rush hour traffic in certain cells of a system, without re-calibration or manual readjustment of transmit power each time the carrier parameters are changed.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

We claim:

1. A transmission system comprising:
   measuring means for measuring a power output of a plurality of power amplifiers of said transmission system and for providing a measured power signal;
   a power amplifier, of said plurality of power amplifiers, having a control input/output, said control input/output being coupled to receive an adjustment factor used to adjust a power output of said power amplifier, said power amplifier further having a calibration data for that power amplifier;
   control means for controlling said power amplifier, said control means having an input coupled to an output of said measuring means and an output coupled to said control input/output of said power amplifier, said control means using said calibration data from said power amplifier and said measured power signal from said measuring means with which to calculate a power adjustment factor for a plurality of power output steps of said power amplifier; and
   communicating means for communicating said measured power signal received from said control means and receiving a command to output said adjustment factor to said power amplifier for a desired power output step.

2. The transmission system of claim 1 wherein said measuring means comprises a remote power monitor coupled to measure an output power of an antenna of said transmission system.

3. The transmission system of claim 1 wherein said calibration data is stored in said control means.

4. The transmission system of claim 1 wherein said power amplifier is a single tone power amplifier.

5. The transmission system of claim 1 wherein said adjustment factor is derived from said measured power signal when said plurality of power amplifiers are transmitting at a target output power for said transmission system.

6. The transmission system of claim 1 further comprising managing means for managing said plurality of power amplifiers, said managing means being coupled to receive said measured power signal from said communicating means and to select a desired power adjustment factor in said control means for control of the power output level of said power amplifier.

7. The transmission system of claim 6 wherein said managing means comprises a base site controller.

8. The transmission system of claim 6 wherein said managing means comprises a local maintenance facility.

9. A transmission system comprising:
   measuring means for measuring a power output of a plurality of power amplifiers of said transmission system and for providing a measured power signal;
   a power amplifier, of said plurality of power amplifiers, containing a calibration data and further having a control input/output, said control input/output being coupled to receive an adjustment factor used to adjust a power output of said power amplifier, said adjustment factor being derived from said measured power signal when said power amplifier is transmitting at a target output power for said transmission system;
   control means for controlling an output of said power amplifier, said control means having an input coupled to an output of said measuring means and a power adjustment interface coupled to said control input/ output of said power amplifier, said control means determining said adjustment factor based upon said measured power signal, said calibration data, and a target output power;

communicating means for communicating said measured power signal received from said measuring means, said calibration data from said power amplifier, and sending a power adjustment factor to the control input/output of said power amplifier, and receiving a control command for a power adjustment of said power amplifier; and managing means for managing the power output of said plurality of power amplifiers, said managing means being coupled to receive said measured power signal from said communicating means and to provide said control command to said communicating means.

10. The transmission system of claim 9 wherein said measuring means comprises a remote power monitor coupled to measure an output power of an antenna of said transmission system.

11. The transmission system of claim 9 wherein said calibration data is stored in said control means.

12. The transmission system of claim 9 wherein said power amplifier is a single tone power amplifier.

13. The transmission system of claim 9 wherein said managing means comprises a base site controller.

14. The transmission system of claim 9 wherein said managing means comprises a local maintenance facility.

15. The transmission system of claim 9 wherein said control means comprises a first set of power adjustment factors for a first predetermined frequency and a second set of power adjustment factors for a second predetermined frequency.

16. The transmission system of claim 9 wherein said control means comprises a first set of power adjustment factors for use at a first predetermined power output level and a second set of power adjustment factors for use at a second predetermined power output level.

17. A transmission system comprising:

a remote power monitor coupled to measure a power output at an antenna;

a plurality of power amplifiers each having a radio frequency, RF, input, an RF output and a control input/output;

a combiner having a plurality of inputs coupled to each of said RF outputs of said plurality of power amplifiers and an output coupled to said antenna;

a power amplifier control interface having an input coupled to an output of said remote power monitor and a power adjustment interface coupled to said control input/output for each of said plurality of power amplifiers, a communication interface is provided for receiving a control command;

a plurality of transceivers each having a transceiver control port, and an RF output coupled to an RF input of at least one of said plurality of power amplifiers;

a second communications interface having a first input/output for receiving control commands, a second input/output connected to all transceiver control ports for control of all transceiver functions, and a third input/output coupled to the communication interface of said power amplifier control interface;

a base site controller having an input/output coupled to said first input/output of said second communications interface for sending said control commands; and a local maintenance facility having an input/output temporarily connected to the input/output of said power amplifier control interface to effect local control of all transceivers, power amplifiers and power monitors for service purposes.

* * * * *